March 1, 1955
M. WEAVER
2,702,960
SALMON EGG DISPENSER
Filed Sept. 8, 1953
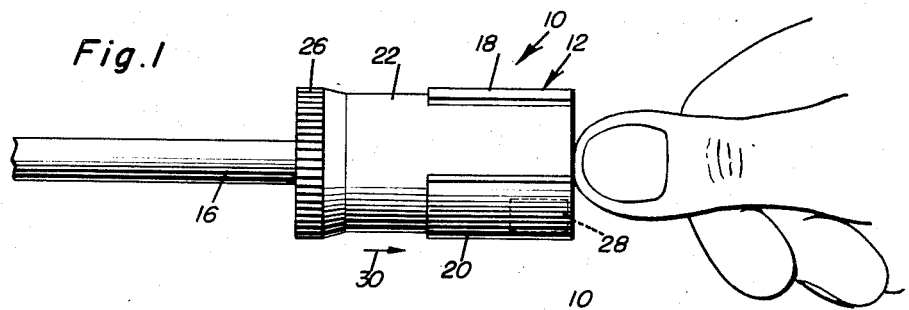
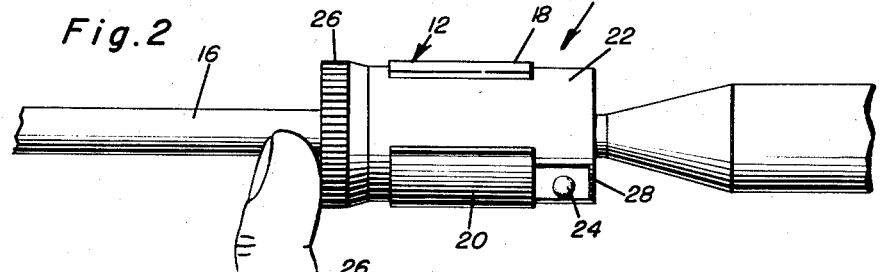
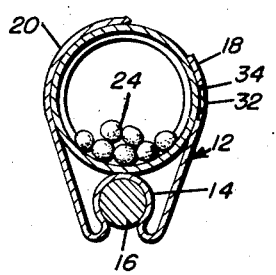
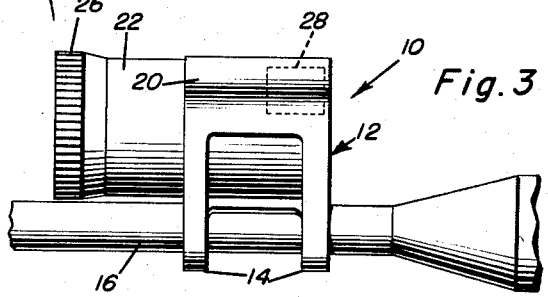
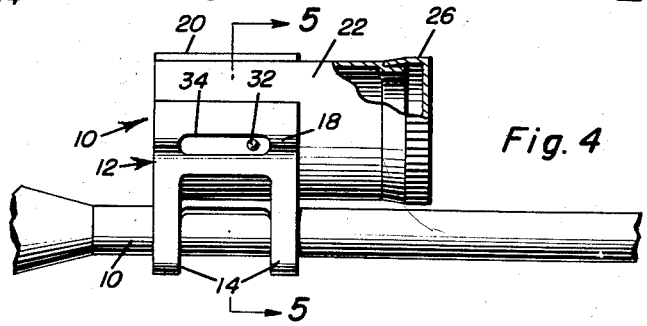
Mark Weaver
INVENTOR.

United States Patent Office 2,702,960
Patented Mar. 1, 1955

2,702,960

SALMON EGG DISPENSER

Mark Weaver, Santa Monica, Calif., assignor of fifty per cent to Adelaide A. Weaver, Santa Monica, Calif.

Application September 8, 1953, Serial No. 378,819

1 Claim. (Cl. 43—25.2)

This invention relates to new and useful improvements and structural refinements in dispensers for salmon eggs, such as are commonly used for bait in fishing, and the principal object of the invention is to provide a dispenser of the character herein described, whereby the salmon eggs may be quickly, easily and conveniently dispensed, one at a time, as required.

Specifically, the invention contemplates the provision of a dispenser of this type which is particularly adapted for attachment to a conventional fishing rod, whereby the dispensing operation may be effected without undue waste of time.

Some of the advantages of the invention reside in its simplicity of construction, in its efficient and expeditious operation and in its adaptability for attachment to fishing rods of different sizes and types.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the invention applied to a fishing rod and illustrating the dispenser in its inoperative position;

Figure 2 is a top plan view, similar to that shown in Figure 1 but illustrating the dispenser in its operative position;

Figure 3 is a side elevational view of the subject shown in Figure 1;

Figure 4 is a side elevational view, similar to that shown in Figure 3, but taken from the relative opposite side and partially broken away so as to reveal the construction of the receptacle used in the dispenser; and Figure 5 is a transverse sectional view, taken substantially in the plane of the line 5—5 in Figure 4.

Referring now to the accompanying drawings in detail, the salmon egg dispenser is designated generally by the reference character 10 and embodies in its construction a stationary member 12 which is preferably formed from resilient metallic material and includes an integral clamp portion 14 which is adapted to be removably attached to a conventional fishing rod 16, as shown.

The stationary member 12 also includes a pair of opposing, arcuate jaws 18, 20 which are adapted to receive therebetween and frictionally engage a substantially cylindrical receptacle 22 for the salmon eggs 24. The receptacle 22 is provided at one end thereof with a removable cap or cover 26 so that the salmon eggs may be readily placed therein, and it will be also observed that the lateral wall of the receptacle at the remote end from the cover 26 is formed with a dispensing opening 28 which is slightly larger than a single salmon egg.

The receptacle 22 is slidably longitudinally between the jaws 18, 20 of the member 12 and when the receptacle is in the position shown in Figures 1 and 3, the jaw 20 constitutes a closure for the opening 28. However, when the receptacle is slid in the direction of the arrow 30 to the position shown in Figure 2, the opening 28 becomes exposed so that the salmon eggs may dispense, one at the time, as required.

Means are provided for limiting the extent of sliding of the receptacle in the jaws 18, 20 of the member 12, these means consisting of a stop pin 32 which projects laterally from the receptacle and is movable in a slot 34 parallel to the longitudinal axis of the receptacle and formed in the jaw 18. This is best shown in Figure 4, and it will be also observed that apart from its primary function of limiting the extent of sliding of the receptacle, the pin 32 will also prevent the receptacle from rotating or twisting axially in the jaws 18, 20. In this manner, assurance is had that when the receptacle is slid to its inoperative position, as shown in Figures 1 and 3, the jaw 20 will be in register with the opening 28 so as to provide a closure therefor.

Since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A salmon egg dispenser comprising a clamp attachable to a fishing rod and comprising a pair of opposite resilient and arcuate jaws, and a cylindrical receptacle endwise slidable in opposite directions between said jaws and frictionally engaged thereby to prevent free sliding of said receptacle, one of said jaws having a slot therein parallel with the longitudinal axis of the receptacle and the receptacle having a lateral stop pin thereon sliding in said slot and coacting with the ends of the slot to limit endwise sliding of the receptacle in opposite directions and prevent rotation of said receptacle relative to the jaws, and said receptacle having a side dispensing opening therein movable behind and clear of the other jaw in the limits of endwise movement of the receptacle to close and expose said opening respectively.

References Cited in the file of this patent

UNITED STATES PATENTS

| | | |
|---|---|---|
| 402,270 | Mumford | Apr. 30, 1889 |
| 1,992,579 | Pearson | Feb. 26, 1935 |
| 2,443,861 | Johnston | June 22, 1948 |

OTHER REFERENCES

Bait Container Held by Belt, Popular Science, June 1948, page 212.